US008732692B2

(12) United States Patent
Fangmeier et al.

(10) Patent No.: US 8,732,692 B2
(45) Date of Patent: May 20, 2014

(54) DEPLOYMENT AND MANAGEMENT FRAMEWORK

(75) Inventors: Helge Fangmeier, Pfaffenhofen (DE); Donald Smith, Morristown, NJ (US); Paul Ponchamni, Greer, SC (US); Kevin Smith, Grove City, OH (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1345 days.

(21) Appl. No.: 11/936,699

(22) Filed: Nov. 7, 2007

(65) Prior Publication Data

US 2009/0119662 A1    May 7, 2009

(51) Int. Cl.
*G06F 9/445* (2006.01)

(52) U.S. Cl.
USPC ............................ 717/176; 717/174; 717/177

(58) Field of Classification Search
None
See application file for complete search history.

(56) References Cited

U.S. PATENT DOCUMENTS

| | | | |
|---|---|---|---|
| 7,451,441 B2 * | 11/2008 | Carter et al. ................ | 717/174 |
| 7,603,440 B1 * | 10/2009 | Grabowski et al. .......... | 717/168 |
| 7,614,052 B2 * | 11/2009 | Wei ............................. | 717/176 |
| 7,657,887 B2 * | 2/2010 | Kothandaraman et al. ... | 717/176 |
| 7,856,631 B2 * | 12/2010 | Brodkorb et al. ............ | 717/177 |
| 2002/0194584 A1 * | 12/2002 | Suorsa et al. ................ | 717/176 |
| 2004/0226010 A1 * | 11/2004 | Suorsa ......................... | 717/174 |
| 2005/0177829 A1 * | 8/2005 | Vishwanath ................. | 717/177 |
| 2005/0198629 A1 * | 9/2005 | Vishwanath ................. | 717/174 |
| 2005/0289538 A1 * | 12/2005 | Black-Ziegelbein et al. . | 717/177 |
| 2006/0168158 A1 * | 7/2006 | Das ............................. | 709/220 |
| 2006/0179431 A1 * | 8/2006 | Devanathan et al. ........ | 717/168 |
| 2006/0253848 A1 * | 11/2006 | Mathieu et al. .............. | 717/168 |
| 2007/0268516 A1 * | 11/2007 | Bugwadia et al. ........... | 358/1.15 |
| 2008/0163199 A1 * | 7/2008 | Rao et al. .................... | 717/177 |
| 2009/0055819 A1 * | 2/2009 | Milner ......................... | 717/176 |

OTHER PUBLICATIONS

Choi et al .XML-based configuration management for IP network devices. IEEE Communications Magazine. Jul. 2004, pp. 84-91. Retrieved on [Dec. 28, 2013] Retrieved from the Internet: URL<http://ieeexplore.ieee.org/stamp/stamp.jsp?tp=&arnumber=1316538>.*
Agrawal et al. Policy-Based Management of Networked Computing Systems. IEEE Communications Magazine, Oct. 2005, pp. 69-75, Retrieved on [Dec. 28, 2013] Retrieved from the Internet: URL<http://ieeexplore.ieee.org/stamp/stamp.jsp?tp=&arnumber=1522127>.*

* cited by examiner

*Primary Examiner* — Thuy Dao
*Assistant Examiner* — Cheneca Smith
(74) *Attorney, Agent, or Firm* — Crowell & Moring LLP

(57) ABSTRACT

A system and method for deploying and managing software components to a plurality of network devices of an extended data communications network. In one embodiment of the invention, a client type defining software components required for at least one network device of the plurality of network devices may be determined. At least one network device of the plurality of network devices corresponding to the client type may be determined. The software components may be provided to the at least one network device based in part on the client type. The software components may be installed on the at least one network device such that functional capabilities of the software components may be employed by the network device. In another embodiment, a record of the software components installed on the at least one network device on a hub server associated with the extended data communications network may be stored.

24 Claims, 10 Drawing Sheets

DEPLOYMENT AND MANAGEMENT FRAMEWORK

FIELD OF THE INVENTION

The present invention relates in general to deploying software components, and more particularly to a standardized framework for deploying and managing software components on at least one network device of an extended communications network.

BACKGROUND OF THE INVENTION

Conventional systems and methods for deployment of software and installation of software to devices in computer networks fail to meet the requirements of extended data communications networks. The increasing demands presented by the addition of terminal devices, support devices for such a network and the burden imposed by managing updates to software components on network devices within an extended data communications network have not been addressed by conventional systems or methods. Conventional systems do not provide a standardized approach to deployment or management of such network devices. Conventional systems are similarly limited by the lack of flexibility and scalability of such networks. Problems may further arise with installation of large number of units, especially meeting the demands of such an installation. Limitations on distribution of software to network devices may result due to demands imposed on the extended data communication network. As such, distribution of software to network devices leads to dependency on external partners and may further lead to a loss of network transparency.

Additionally, conventional systems have not addressed issues arising from distribution of network devices across different business units or geographic regions. Many extended data communications networks span multiple countries and impose varying requirements on the network and devices provided by such a network. Conventional systems have not provided a means for addressing such requirements, nor particular needs of terminal devices services by such a network including providing multiple languages and settings corresponding to a particular region. Another drawback of conventional systems is the inability to provide consistent support for end users. Further, conventional systems have not addressed providing an extended data communications network with the ability for development of a particular client solution for each device serviced by the network.

BRIEF SUMMARY OF THE INVENTION

Disclosed and claimed herein are a system and method for deploying and managing software components to a plurality of network devices of an extended data communications network. In one embodiment, a method includes receiving a client type defining software components required for at least one network device of the plurality of network devices. The method further includes determining at least one network device of the plurality of network devices corresponding to the client type and providing the software components to the at least one network device based in part on the client type. The method further includes installing the software components on the at least one network device such that functional capabilities of the software components may be employed by the network device. Finally, the method includes storing a record of the software components installed on the at least one network device on a hub server associated with the extended data communications network.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

Figure 1:
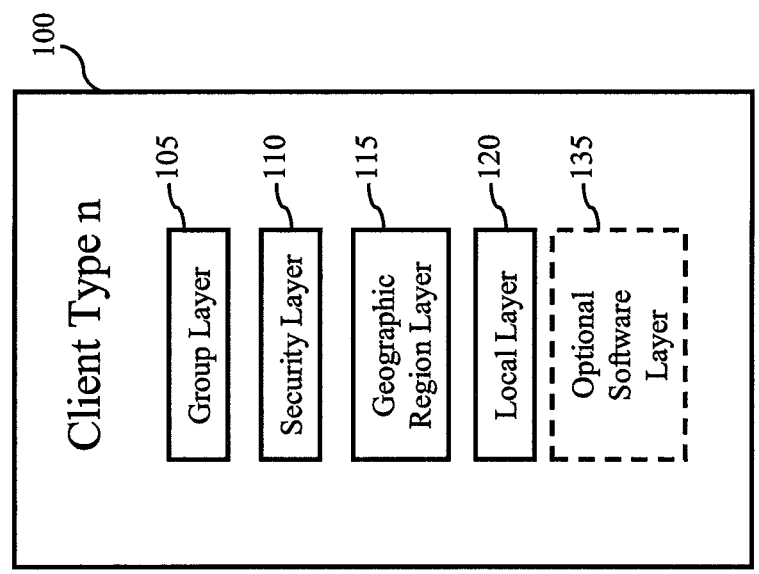
FIG. 1 depicts a client type according to one or more embodiments of the invention.

The present disclosure relates generally to a system and method for deployment to and management of software components in network devices of an extended data communications network. In one embodiment, the system and method may be embodied using a framework architecture, to provide a standardized process for deployment and management of software components. According to one aspect of the invention, the framework may assign a client type to any network device, wherein the client type may be used to define at least one of software components and configurations required for the network device. According to another aspect of the invention, the framework may provide at least one of network support, hardware requisition and individual network device services, as will be described in more detail below, for at least one geographic region. Similarly, the framework may be configured to provide at least one of assigning XML file descriptions, installation of network devices, a code server for the network, driver management and site management.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, A, B or C means any of the following: A; B; C; A and B; A and C; B and C; A, B and C. An exception to this definition will occur only when a combination of elements, functions, steps or acts are in some way inherently mutually exclusive. Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium, which may include any medium that can store information. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

1. Client Type and Layer

Referring now to the figures, FIG. 1 depicts a representation of a client type 100 as may be employed by the framework of the invention. In one embodiment, client type 100 may be used to define software components required for a network device of the network. Software components may correspond to applications, packages, settings, drivers, scripts or computer data in general. According to another embodiment, network devices, such as a terminal devices, personal computers and end unit devices in general may be assigned a client type. For example, the framework may assign a particular client type (e.g., client type 100) to a particular network device coupled to the network, such that deployment and management of software components on the network device may be based, at least in part, on the assigned client type. As may be appreciated, the framework may support a plurality of client types for a plurality of network devices as will be described in more detail with reference to FIG. 2.

Client type 100 may define a plurality of layers corresponding to a network device. In one embodiment, client type 100 may include a group layer 105, security layer 110, geographic region layer 115, local layer 120, and an optional software layer 125. Each layer may define particular software components to provide to the network device. According to one embodiment, group layer 105 may represent software components which are to be stored on all network devices within the network. Group layer 105 may be associated with any component provided by a network server. Software components provided by group layer 105 may correspond to any software component common throughout the network. In another embodiment, security layer 110 may provide security based software components and operating system security patches. Security layer 110 may be globally applied to the extended network. In one embodiment, it may be mandatory for each client type to include security layer 110.

According to another embodiment, client type 100 may include a geographic region layer 115 for software components related to a geographic region of the network. The geographic region may support network devices of the network as will be described below with reference to FIG. 4. Software components of the geographic region layer 115 may be defined by a group data server of the network. Client type 100 may include a local layer 120 to represent software components associated with a location or business unit in the extended network. According to another embodiment, local layer 120 may include locale information related to at least one of a users language, environment or cultural conventions. As such, local layer 120 may represent software components for at least one of a user specified language, keyboard layout, sorting order, and formats related to numbers, dates, currencies, time, etc.

According to another embodiment, client type 100 may be represented using an XML file. The client type XML file may be used to store data directing a build process of a network device, wherein the build process is associated with installation of software components on the network device. The XML files may additionally store data related to the end result of the build process. In that fashion, the framework may utilize client type XML files for deployment and management of software components to network devices. Similarly, the use of client type XML files by the framework may enable management of network devices and software components, which may be granular and dynamic. In one embodiment, the client type XML file may be configured for defining software components which comprise client type 100 including metadata associated with client type 100. Similarly, client type layers may be defined by XML files. In another embodiment, XML layer files may be shared among multiple client types. According to another embodiment, client type XML files may be located on code servers supporting a network device, as described below in more detail with regards to FIG. 4.

Figure 2:
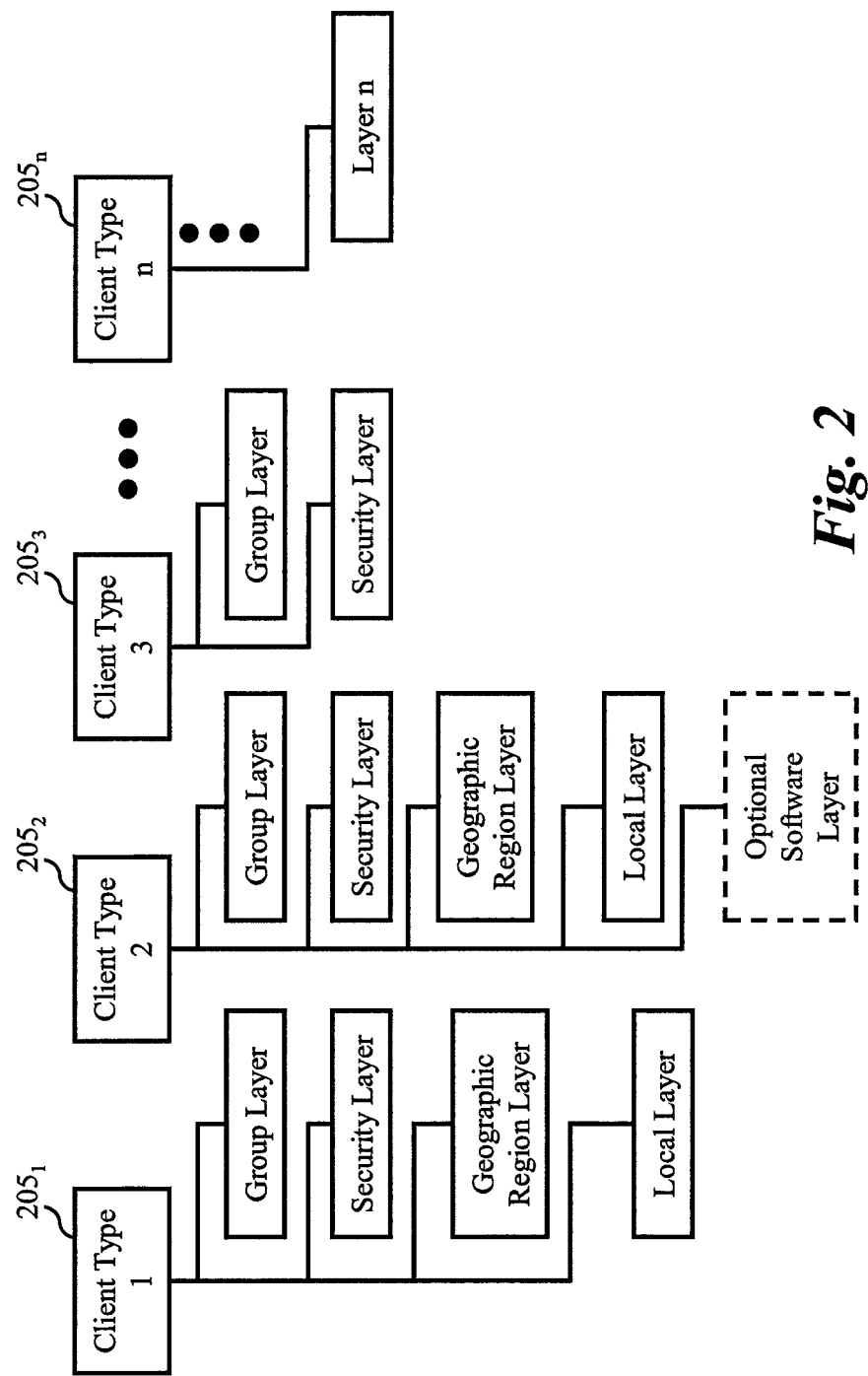
FIG. 2 depicts a graphical representation of a plurality of client types according to certain embodiments of the invention.

Referring now to FIG. 2, a representation is provided of a plurality of client types $205_{1-n}$ according to one or more embodiments of the invention. The plurality of client types $205_{1-n}$ (e.g., client type 100) may be provided by the framework. Each of the client types $205_{1-n}$, may be associated with one or more network devices. The layers which define the client types $205_{1-n}$ are not limited in number and each layer is not limited in the software components included within the layer. Therefore, the various client types $205_{1-n}$ that can be defined by the framework may not be limited. According to another embodiment, layers may be defined on a client type basis. An unlimited number of client types $205_{1-n}$ may exist, each client type including a unique set of defined layers. Layers and client types may be defined and used as needed. Client types $205_{1-n}$ may be presented as a unique option for a network device in the network. According to another embodiment, the framework may provide a standard deployment model used for an entire network, wherein a network device may be automatically assigned a client type $205_{1-n}$ having a predefined set of layers. As such, the framework may support standards across the network. Additionally, flexibility may be allowed for a completely localized implementation of client types $205_{1-n}$ designed to meet requirements of a specific location within the extended network.

2. Defining a New Client Type

According to another aspect of the invention, client types may be defined and/or created for each terminal device in the extended network. In one embodiment, a client type may be defined using a plurality of XML file elements. Table 1 provides elements for a client type XML file according to certain embodiments of the invention.

region and local layers may be provided by directories. Client types may be defined by an authorized technician through declaration of client type XML elements and layers.

TABLE 1

| Element Name | Child Of | Contains Data | Description |
| --- | --- | --- | --- |
| <NetworkDefinition> | Root | No | Root Element. The "name" attribute contains a string description of the local network. This name will appear in the drop-down selection for the technician to choose from and is also referenced in NetworkLocator.xml. |
| <DefaultDNSDomain> | <NetworkDefinition> | Yes | This contains the fully qualified domain name for the location being defined in the Network Definition |
| <InstallPath> | <NetworkDefinition> | Yes | The install path is the GC directory on the code server for this location. Therefore, when clients are built for this location, they will build from this install path. |
| <SecondaryInstallPath> | <NetworkDefinition> | Yes | If the install path is unavailable, the installation will default to this secondary path. |
| <DefaultNetBIOSDomain> | <NetworkDefinition> | Yes | This should be the NetBIOS domain name for the fully qualified domain specified in DefaultDNSDomain |
| <SiteLocation> | <NetworkDefinition> | Yes | This is primary used for reference and readability. |
| <ShortLocation> | <NetworkDefinition> | Yes | The value for this element is used as a variable in the solution. Meaning, whenever %ShortLocation% is found in the solution, the value is replaced with the value of this element. |
| <GeographicRegion> | <NetworkDefinition> | Yes | The value for this element is used as a variable in the solution. Meaning, whenever %GeographicRegion% is found in the solution, the value is replaced with the value of this element. |
| <PrimaryDomainController> | <NetworkDefinition> | Yes | FQDN of the primary domain controller for the site. Used to make AD connections. |
| <SecondaryDomainController> | <NetworkDefinition> | Yes | FQDN of the secondary domain controller for the site. Used to make AD connections if primary is not available. |
| <StagingOU> | <NetworkDefinition> | Yes | This element is to house the OU in which clients are staged in, prior to them being moved to a production OU. |
| <ComputersOU> | <NetworkDefinition> | Yes | This is the root OU in which the solution will search to find the final production OU.* |
| <LDAPPort> | <NetworkDefinition> | Yes | This is the port to be used for LDAP. In the case of AD, the default is 389. |
| <LDAPString> | <NetworkDefinition> | Yes | LDAP string for AD site |
| <LogonDomain> | <NetworkDefinition> | Yes | NetBIOS domain name for AD domain |
| <DefaultLocale> | <NetworkDefinition> | Yes | The default locale is the Microsoft 4 digit code which represents the locale for his network definition. |
| <TimeZone> | <NetworkDefinition> | Yes | This is the MUI code for the local time zone for this network definition. |

In one embodiment, the client type XML file may require generating at least one of an image file, disk-part file, layer XML file and layer software components. In one embodiment the image file may be a collection of updates, patches and/or enhancements to a component delivered in the form of a single installable package. The image file may be associated with a global group client image file. It may be appreciated that custom image files may be used for each client type. According to another embodiment, a disk-part answer file may include text files used to run from the command line. The disk-part answer file may correspond to a disk configuration of a terminal device. According to another embodiment, a layer XML file may be required for installation of a software package, to make a configuration change and to finalize an image file. Similar to defining a client type XML file, a layer XML file may be generated through definition of layer elements, wherein the layer elements may be associated with at least one of segment types, paths of execution files names and sub-elements specific to a layer. In one embodiment, a layer XML file may correspond to one of the global, geographic region and local locations associated with the network device. Layer XML files pertaining to each of the global, geographic Referring now to FIG. 3, one embodiment of a graphical representation of the aforementioned framework and associated functions is shown as framework 300. According to one embodiment of the invention, functions of framework 300 may be categorized into categories including at least one of a support 302, group data center 304, hardware requisition 306 and individual network device services 308.

Framework 300 may provide support functions 302 to provide technical assistance for a network device including services attempting to help the user of a network device solve specific problems with a particular component. Support functions 302 may include business unit support function 310 to provide technical assistance for a particular subset of network devices—a business unit—supported by the network. Business unit support function 310 may include desktop consistency functions 312 to provide uniform software components for network devices associated with a business unit of the network. According to another embodiment, support center functions 302 may include a component deployment function 314, including global framework availability 316 to determine availability of network devices. Framework 300 may be configured to deploy non-standard hardware 318 including installation of state dependent drivers 320. Similarly, support center functions 302 may be configured to support configurations of network devices 346 including support of client XML types 348. In another embodiment of the invention, support center functions 302 may be configured to limit builds 322 based on security group functions 324. Functions 322 to limit builds may restrict the use of a component version through access control lists. Further, functions to limit builds 322 may restrict authorization for use of pilot and/or production versions. According to another embodiment, support center functions 302 may be configured to provide recovery of network devices 326 base on a stored client type. For example, software components of a network device that becomes inoperable may be recovered using network device recovery function 326. Network device recovery function 326 may include systems management server (SMS) inventory functionality 328, which may be utilized for such a recovery. In another embodiment, support center functions 302 may be configured to review build metrics 350 using XML logs and/or SMS reports 352 generated by framework 300. Build metrics may be embodied in a summary XML file providing specific details for a build including the times to perform functions of the framework 300. Further, support center functionality 302 may be configured to perform automated roll-outs 330 of software components to particular network device. Such rollouts may be based in part on functionality for storing XML files 332.

According to another aspect of the invention, geographic region functions 304 may include quality assurance functions 334 to provide processing of network device design 336 and testing of network device concepts 338. In one embodiment, testing of network concepts 338 may include testing functionality of newly added hardware geographic region functions 304 may include solutions library functions 340 for storage of client types provided by the framework. In one embodiment, solutions library functions 340 may include packaging standards functions 342 providing standards for data storage, and package image management system (PIMS) functions 344 for management of data related to client and/or layer types. Similar to support center functions 302, geographic region functions 304 may be configured to support configurations of network devices 346 including support of client XML types 348 geographic region functions 304 may be configured to review build metrics 350 using XML logs and SMS reports 352 generated by the framework.

Hardware requisition functions 306 may be utilized for integrating hardware to a network device, including hardware integration functions 354 and device driver functions 358. Hardware integration functions 354 may be configured to provide interoperation of network device software components including functionality installation of drivers 356, using driver XML files. Device driver functions 358 may be configured to provide establish driver standards and provide functionality for storage of drivers on code servers of the network.

According to another aspect of the invention, network device services functions 308 may be provided by framework 300 for deploying and managing software components to networks devices. Network device services functions 308 may provide performance optimization functions 362 for optimization of network device efficiency. Optimization functions 362 may provide functionality for disk de-fragmentation 364 of a network device and integration of best practices 366. Best practices 366 may include at least one of standard packaging of all applications, providing a single image for all device hardware and a layered approach to the image to provide flexibility. In another embodiment of the invention, network device services functionality 308 may provide non-standard configuration functions 368 for support of non-standard configurations for network devices. Non-standard configuration functions 368 may provide support for client types with layers defined for a particular network device as described in more detail with reference to FIG. 2. Additionally, non-standard configuration functions 368 may include functionality for determination of framework availability 370. Framework availability 370 may be used to add external devices such as personal computers, to framework 300. Functionality may be provided for deploying non-standard hardware configurations 372 including functions 374 for determining client types and associated client type XML files. Device services functions 308 may provide limiting installation of network devices 376 based on group membership directory access 378. Limiting installation of network devices 376 may be enabled through restricting deployment of multiple versions of components which may be associated with production, development and/or a new operating system technology. Pilot program functions 380 may be provided for testing of network devices supported by the network. Pilot program functions 380 may include integrating at least one of new hardware types, operating systems and software components. Pilot program functions 380 may incorporate functions for client XML types 348 and limiting installation of network devices 376. As such, control tests may be performed for pilot programs to determine production of the pilot program. According to another embodiment, lean client functions 382 may be provided for determining necessary components for device operation and/or removing components from devices which are not required. Additionally, lean client functions 382 may include integration of information into self service software (SSS) such that device users can select approved software components from a software list. In yet another embodiment, network device services functions 308 provides mobility support functions 386 for allowing network devices to interoperate with different regions of the network. As such, mobility support functions 386 may include functions 388 for automated configuration of network devices during travel. Functions 388 may be used to rebuild network devices when traveling to a different region provided by framework 300. Network device services functions 308 provides client setting recovery functions 390 for recovery of software components due to one or more of hardware and software failure. As such, client setting recovery functions 390 may include functions 392 for storage of individual network device client type XML files 348. Recovery functions 390 can refer to codes servers provided by framework 300 for hidden boot data.

Figure 3:
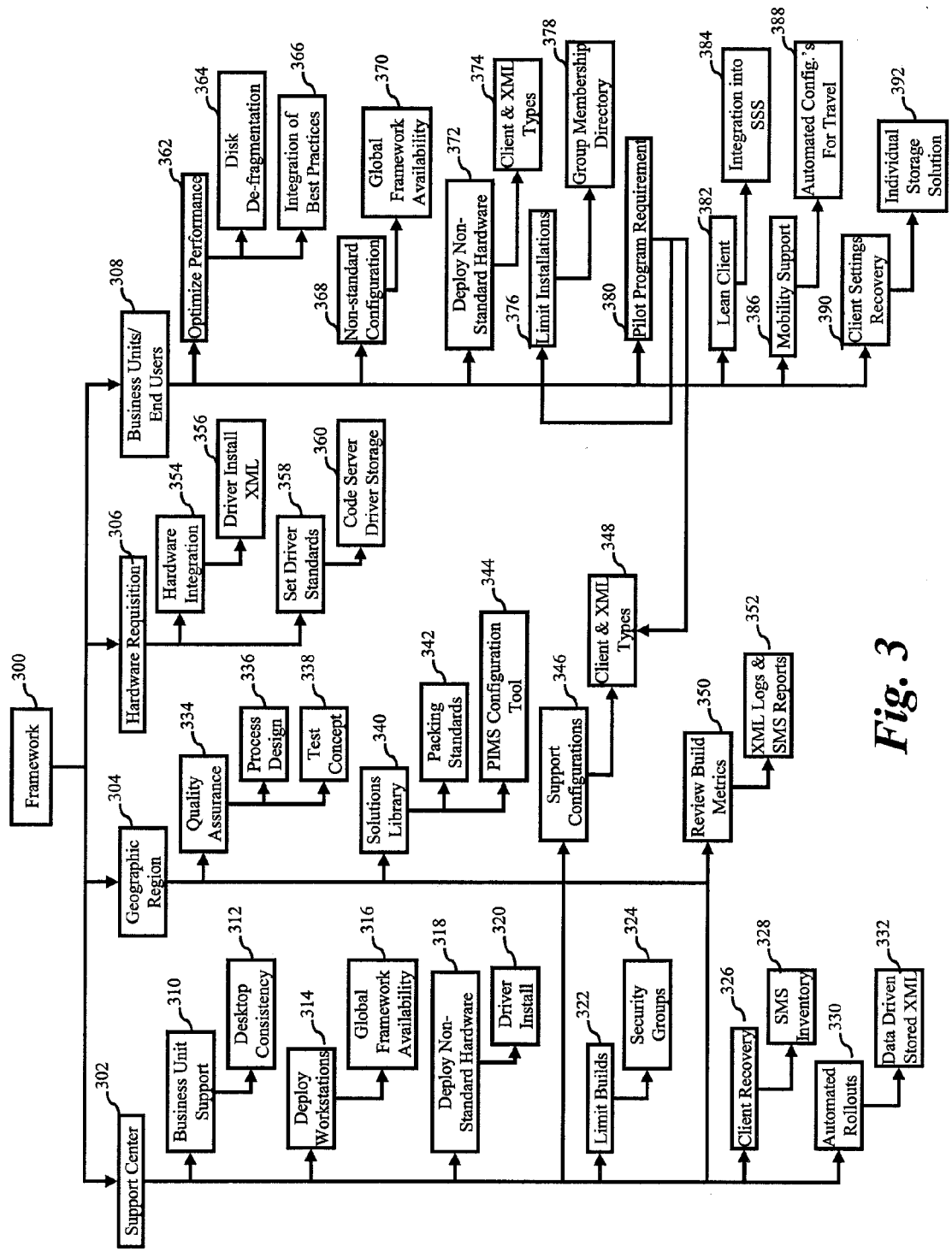
FIG. 3 depicts a simplified block diagram of a framework according to one or more embodiments of the invention.
Figure 4:
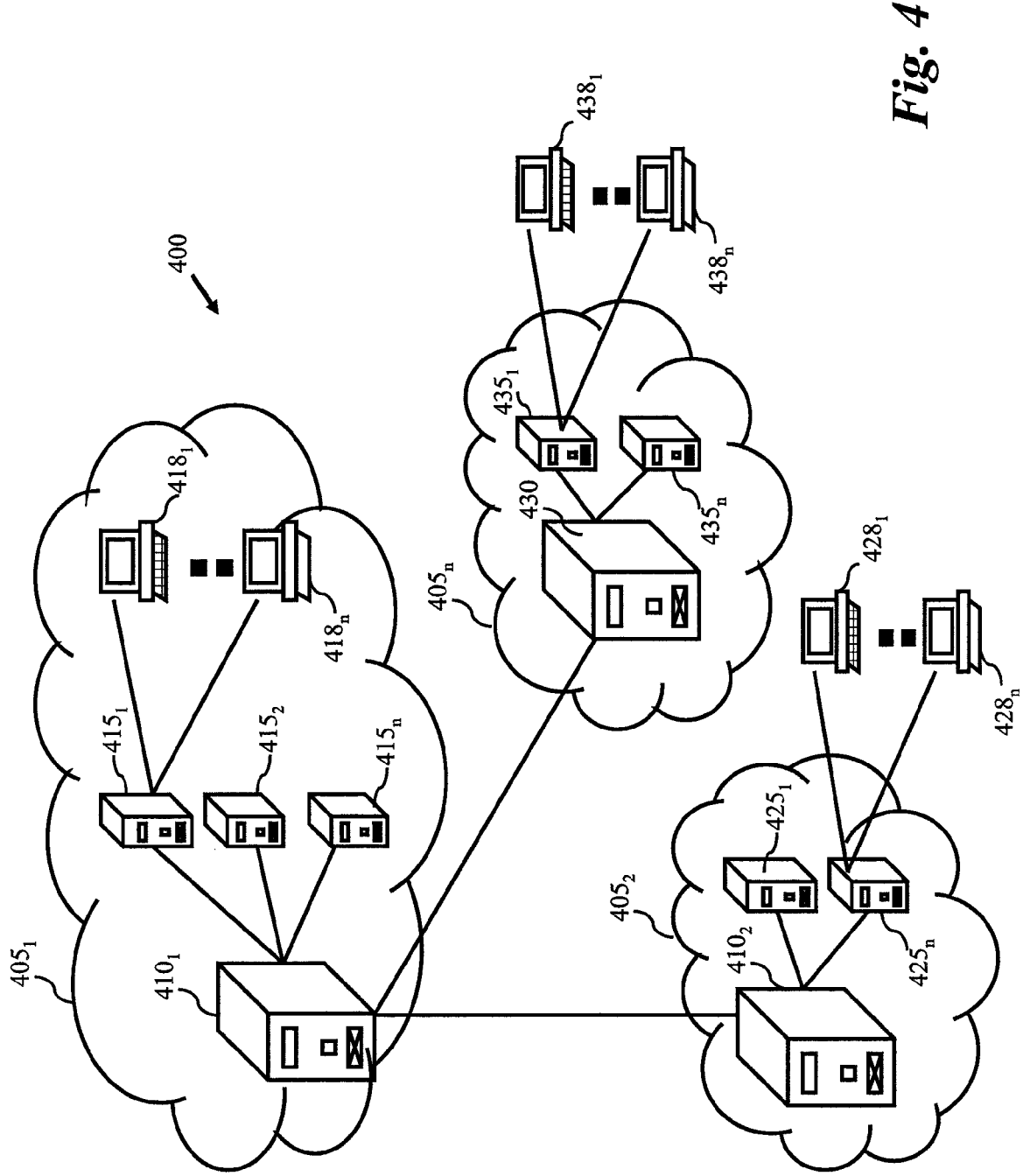
FIG. 4 depicts a simplified system diagram as may be employed by the framework of FIG. 3.

As depicted in FIG. 4, a simplified system diagram is provided of an extended data communications network 400, hereinafter "network 400", as may be employed by the framework 300 of FIG. 3. Network 400 in one embodiment of the invention is shown including a plurality of regions $405_{1-n}$, wherein each region may be assigned to a geographic region and/or any predefined region associated with network 400. According to another embodiment, regions $405_{1-n}$ may each include a geographic region code server $410_{1-n}$ geographic region code servers $410_{1-n}$ may be configured to support network devices within a region to which it is assigned. However, it may be appreciated that multiple servers may be used for each region. To that end, it may also be appreciated that a single geographic region code server (e.g., geographic region code server $410_1$) may support an extended data communications network 400. According to another embodiment, geographic region code servers $410_{1-n}$ may be configured to support a plurality of code severs $415_{1-n}$, $425_{1-n}$ and $435_{1-n}$, respectively. In another embodiment, each code server $415_{1-n}$, $425_{1-n}$ and $435_{1-n}$ may be configured to support network devices $418_{1-n}$, $428_{1-n}$ and $438_{1-n}$ in each region.

According to another embodiment of the invention, geographic region code servers $410_{1-n}$ may be configured to store files ,associated with client types (e.g. client type 100) associated with network devices $418_{1-n}$, $428_{1-n}$ and $438_{1-n}$. In one embodiment, the files may be used for a build of a particular device as will be discussed in more detail below with reference to FIG. 5. Similarly, system 400 may provide deployment of software components to any and all of network devices (e.g. network devices $418_{1-n}$, $428_{1-n}$ and $438_{1-n}$), code servers (e.g., code servers $415_{1-n}$, $425_{1-n}$ and $435_{1-n}$) and geographic region code servers (e.g., geographic region code servers $410_{1-n}$) of network 400. As such, system 400 may be configured to provide a standardized deployment of software components and provide a more complete installation of an operating system for the network devices. In one embodiment, the files may include scripts to automate the build process, an XML file containing configuration data, a hard disk image file, a driver set for supporting hardware, and Group and Security Layer software components (e.g., Group and Security layers 105 and 110). Although network 400 is characterized as having a plurality of regions, it may be appreciated that network 400 may include a single region.

According to another embodiment, network 400 may include management sites for providing configuration information for installation of network devices and linking defined IP networks to the sites. In one embodiment, code servers $415_{1-n}$, $425_{1-n}$ and $435_{1-n}$ may operate as management sites for network 400. In one embodiment, management sites may be created and deleted by authorized users of network 400. Management sites may provide management of IP network assignments for network 400 including at least one of assigning and removing IP addresses to sites.

According to another aspect of the invention, an installation process may be provided as a standard deployment model for network 400. The standard deployment model may be applied globally to network 400 and support standards that are common across network 400. As such, flexibility may be provided to allow for a completely localized implementation designed to meet specific business requirements within a specific location of the group, such as a network device (e.g., network devices $418_{1-n}$, $428_{1-n}$ and $438_{1-n}$.). In one embodiment, the standard deployment model may include a hub and spoke installation process as will be described below in more detail with references to FIG. 10.

Figure 5:
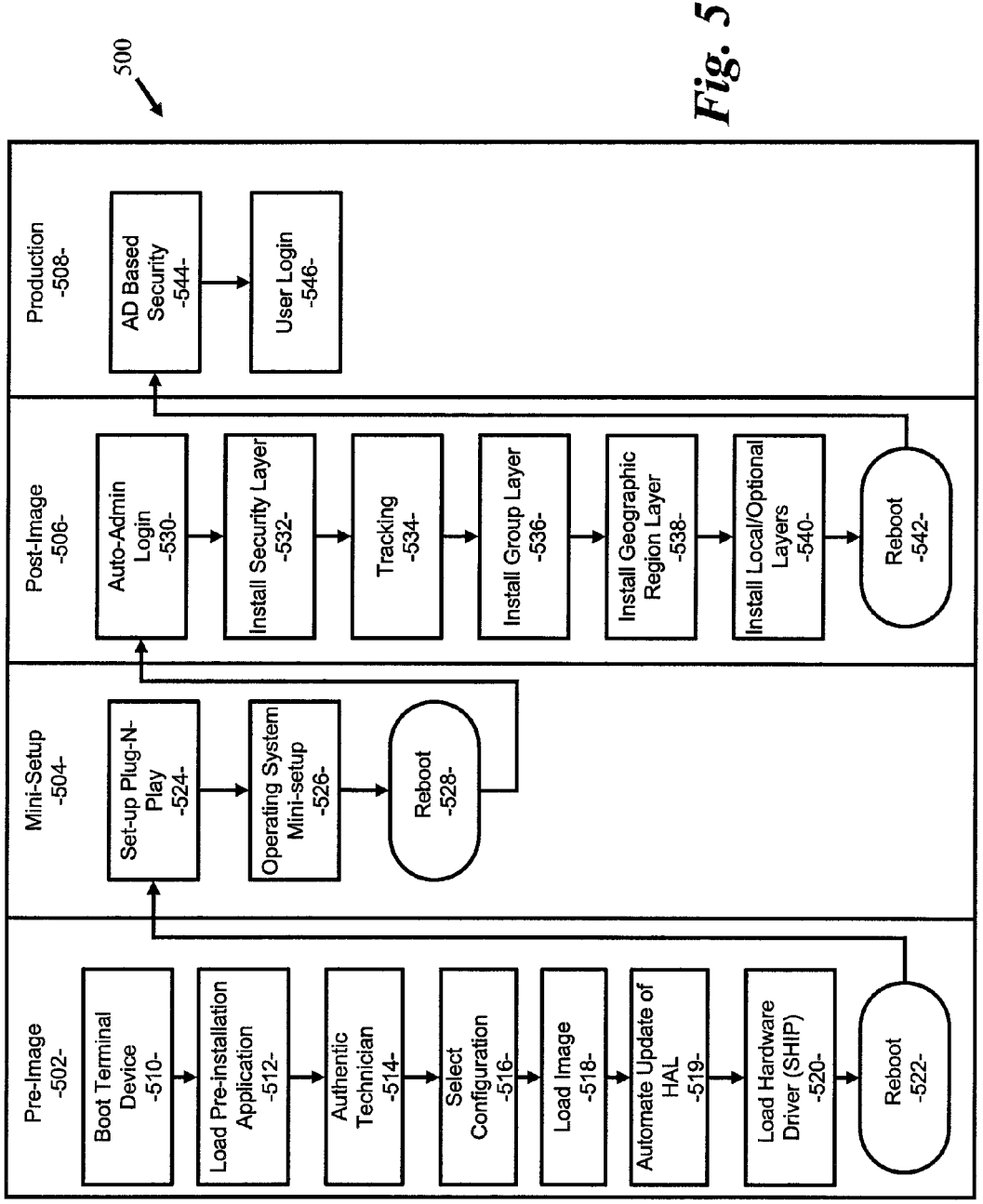
FIG. 5 depicts a simplified block diagram of an installation process as may be employed by the framework of FIG. 3.

Referring now to FIG. 5., installation process 500 is shown as it may be employed by the framework 300 of FIG. 3. In one embodiment, installation process 500 may be used to provide a standard deployment model for software components of an extended data communications network (e.g., network 400). Process 500 as shown includes a plurality of stages including: pre-image stage 502; mini-setup stage 504; post-image stage 506 and production stage 508. According to one embodiment of the invention, process 500 begins at pre-image stage 502, which may be initiated at block 510, wherein a network device is turned on and the operating system is loaded. The network device may boot from an installation disk if needed. At block 512, an operating system pre-installation platform may be loaded on the network device. In one embodiment, the pre-installation platform may be configured to start and guide a technician through information gathering needed to complete the installation of software components on the network device. The pre-installation platform may further include a script function to validate a networking session with the extended network. In one embodiment, the script function may include at least one of a specified IP address, a specified IP gateway/router address and a DNS connection suffix, to ensure connection with an extended data communications network group. Installation process 500 may be terminated if the validation process posts an error.

According to another embodiment, the pre-installation application of block 512 may be configured to locate and load a management site for installation. In one embodiment, the management site may include directory information associated with software components required for client installation. Process 500 may provide at least one of verification of a source path and retrieval of a network devices virtual machine interface (VMI) at block 512. Further, at least one of obtaining make and model strings of the unit, performing a driver check for files, determining if hardware is supported, loading site data including Active Directory servers and configuration information, time zone data, locale information for setting language support, and a host of other information may be performed at block 512. In another embodiment, an installation ID for a particular installation session may be created. The installation identification (ID) may be a Globally Unique ID (GUID) created using libraries obtained in the operating system. The installation ID may be associated with the terminal device for the duration of the installation. In another embodiment, the installation ID and build metrics acquired during the installation may be written to a storage XML file which may be passed and amended throughout process 500.

Pre-image process 502 continues with authentication of a technician at block 514. In one embodiment, the technician authentication process may include validation of a technicians credentials including at least one of user identification, a pass code and a network authority level. At block 516, a configuration for the network device may be selected including at least one of loading of site locations and setting default to a previous located site, establishing proper locale information and loading client types. Once data is loaded, pre-image process 502 may provide options to a technician to make changes to selections presented. The configuration selected may be written to the aforementioned storage XML file including site name, locale and keyboard selection, client type name, and all XML data contained in the client types corresponding data files including images to apply and applications lists to install.

At block 518, loading of an image file associated with a base layer of a client type may be performed. In one embodiment, block 518 may include partitioning a hard drive of a terminal device to match the specification in the client type, once the configuration has been accepted. The partitions may include a partition to store an image of the pre-installation platform boot disk used to configure the terminal device. A second partition may be provided for implementation of an operating system. After the partitions are created and initialized, pre-image process 502 may initiate an imaging process to write images specified in the client type to memory. In one embodiment, images may be written to a hard disk, code server or any other non-volatile memory location.

Figure 8:
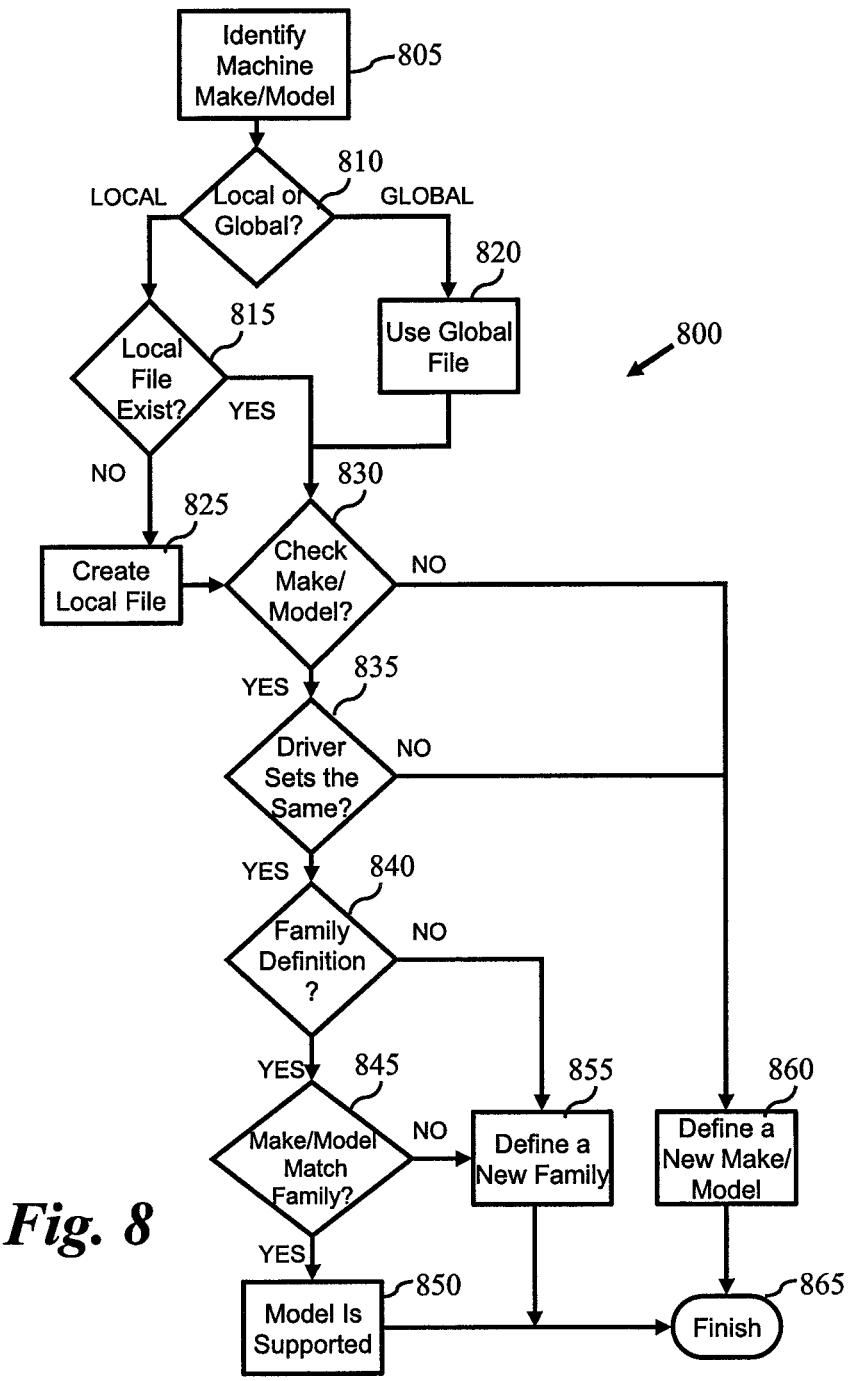
FIG. 8 depicts a process flow chart of a driver integration process as may be employed by the framework of FIG. 3.

After the disk imaging utility operation is complete, finalization operations may be run, including at least on of automating update of a hardware abstraction layer (HAL) at block 519 and installation of hardware specific drivers using a driver integration process at block 520, as defined in more detail in FIG. 8. In one embodiment, one of a plurality of HALs may be used on the image via Hal type interchangeability. The Pre-image process 502 may include at least one of evaluating a HAL at block 519 and, if necessary, updating the HAL to comply with the machine-specific type, updating a key information file associated with the locale assigned, and copying of the interview log. The key file may comprise a stored variables XML file. The interview log may be copied to a local geographic region code server. At block 522, the pre-image stage 502 may be completed following rebooting of the terminal device. The machine may reboot into the operating system at block 522.

Installation process 500 follows pre-image process 502 with mini-setup stage 504. Mini-setup stage 504 may include at least one of plug-and-play setup at block 524, operating system setup at block 526 and rebooting at block 528. In one embodiment, mini-setup stage 504 may be used to provide computer specific information for an operating system of the terminal device.

In another embodiment, process 500 may include post-image stage 506 which may be used to install applications as defined by client type selection (e.g., pre-image block 516). To ensure a proper operating environment, post-image process 506 loads an operating system and no network user is logged in at this time during the process 530. A security layer may be initiated at block 532 to ensure connection with the extended network. Additionally post-image process 506 may include tracking at block 534 for changing the terminal device name, joining the domain, flagging the registry and adding accounts to a local administrators group. The elements provided at block 534 may be inserted in an XML file for future use. At block 536, group layer applications (e.g., group layer 210) may be installed to the terminal device. At block 538, geographic region layer applications (e.g., geographic region layer 215) may be installed to the terminal device. At block 540, local and/or optional layer applications (e.g., local and optional layers 120 and 125) may be installed to the terminal device. The machine may reboot into the operating system at block 542. According to another embodiment, post-image process 508 may include a finalization process configured to clean up the installation environment and prepare a terminal device for production.

Group Client installation process 500 may be completed with production stage 508. In one embodiment, production stage 508 may include active directory (AD) based security Group Policy Objects (GPO) at block 544 and prompting user login at 546.

3. Managing Driver Including XML Processing

Referring now to another aspect of the invention, management of a system hardware integration process (SHIP) (e.g. hardware requisition 306) may be employed by the framework of FIG. 3. Similarly, the management of the SHIP may be used in conjunction with the installation process of FIG. 5. In one embodiment, SHIP may be configured to perform at least one of copying, installing and updating of operating systems configuration and imagining process to enable network devices (e.g., network devices $418_{1-n}$, $428_{1-n}$ and $438_{1-n}$) to function fully within the an extended network (e.g., network 400). As such, the SHIP may be a scripting process for site management of software components delivered to a terminal in the extended network.

Figure 6:
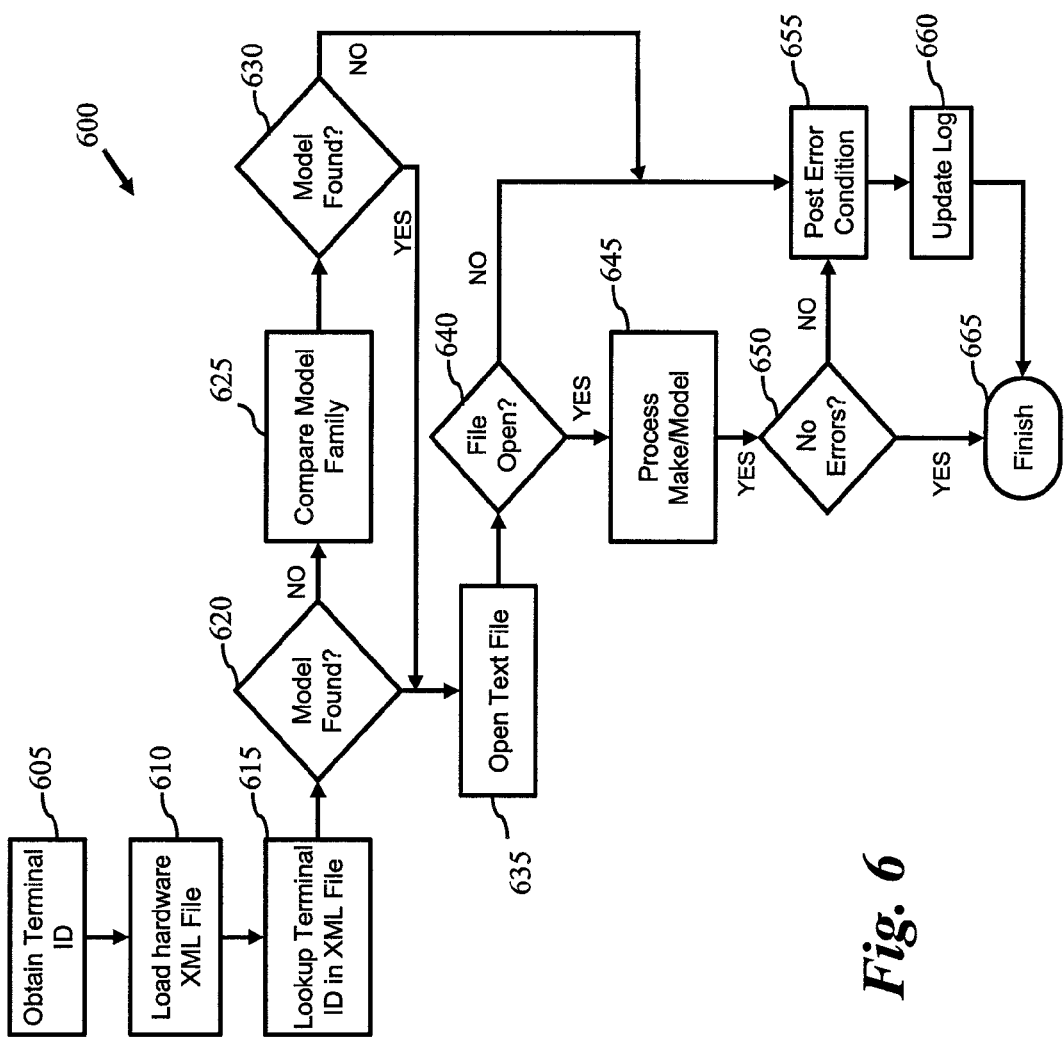
FIG. 6 depicts a process flow chart of a system hardware integration process as may be employed by the framework of FIG. 3.

FIG. 6 depicts SHIP 600 according to one embodiment of the invention. SHIP 600 may be initiated by accessing a virtual machine interface (VMI) of a network device (e.g., network devices $418_{1-n}$, $428_{1-n}$ and $438_{1-n}$) at block 605 to determine make and model of the network device. At block 610, hardware XML files may be loaded by the terminal device. In one embodiment, a hardware XML file may be used to store data directing SHIP 600. According to another embodiment, the hardware XML file may be stored by a geographic region and/or code server of network 400. At block 615, the network device make and model may be searched within the hardware XML file previously loaded at block 610. A determination may be made at block 625 for a match between the make and model of the network device and data provided by the hardware XML file. If a match of the model was not found, a model family definition may be compared at block 625. In one embodiment, the model family definition may correspond to similar models of network devices having a similar driver set for the family of network devices. A determination may be made at block 630 if the model was located within a family driver set. Process 600 may include opening command line files at block 635 if the make and model are located either at block 620 or 630. Process 600 may post an error at block 655 if the make and model is not located at block 630. Process 600 follows with determining success of opening a make and model from the hardware XML file at block 640. If the make and model file fails to open, process 600 may post an error at block 665. If the make and model file opens, the make and model information may be processed at block 645 which is described in more detail below with reference to FIG. 7. An error check may be performed at block 660 such that an error-free determination will terminate process 600 at block 655. Errors determined at block 650 may post an error at block 655. Process 600 may include updating a log for future investigation at block 660.

Figure 7:
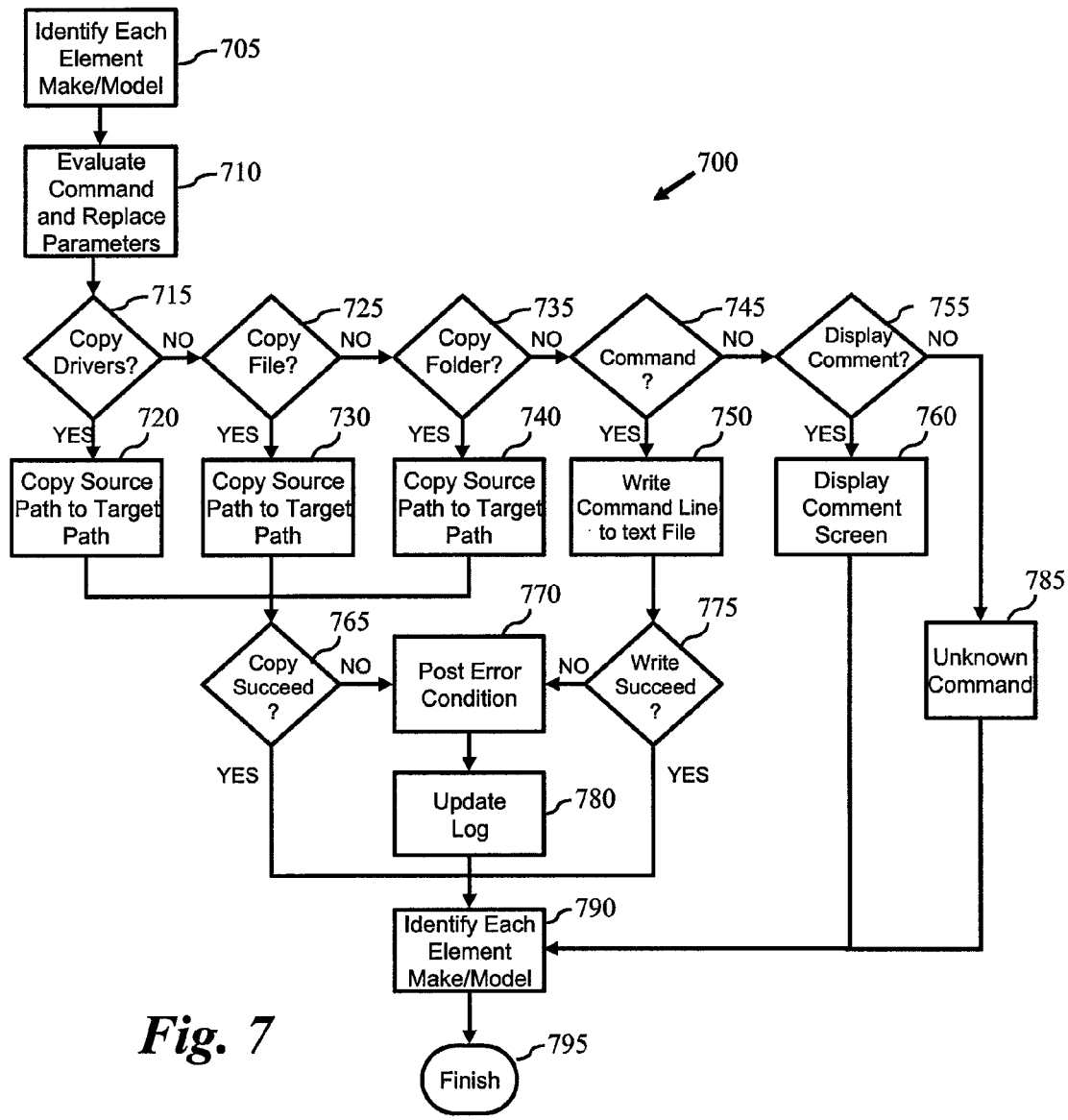
FIG. 7 depicts a process flow chart of network device identification process as may be employed by the framework of FIG. 3.

Referring now to FIG. 7, process 700 is shown for processing make and model files (e.g., processing by block 645) as may be employed by the framework 300 of FIG. 3. According to one embodiment, process 700 may be initiated at block 705, wherein make and model files associated with a network device (e.g., network devices $418_{1-n}$, $428_{1-n}$ and $438_{1-n}$) are identified. In certain embodiments, make and model files may be defined by the identification of a particular network device. According to another embodiment, process 700 may be executed for each make and model file identified at block 705. At block 710, command and replacement parameters may be evaluated for each make and model file. Command and replace parameters may be employed by process 700 to specify path to local command line text files for a particular network device. Additionally, command parameters provide functions to provide at least one of copying drivers, copying folders, commanding checks and displaying comments associated with the make and model file. The command parameters may be processed according to the order defined by the make and model file.

At block 715, determination of driver copying may be determined. If available, drivers may be copied from a source path to a copy path at block 720. In one embodiment, a copy path may provide information related to at least one of driver source and destination. Negative determinations at block 715 may continue with determination of copying a folder associated with the hardware XML files at block 725. If available, file folders may be copied from source path to the copy path at block 730. Negative determinations at block 725 may follow with determination of copying a file associated with the hardware XML files at block 735. If available, file folders may be copied from source path to the copy path at block 740. Copied data at blocks 720, 730 and 740 may be addressed at block 765 of process 700. Determination of a successful copying may be determined at block 765. Negative determinations at block 735 will prompt determination of command line data associated with the hardware XML files at block 745. If available, command line files may be written to a command line text file at block 750. Data which is to be written at block 750 may be addressed at block 775, wherein determination of copying success may be determined. Errors received from either blocks 765 or block 775, may be posted at block 770. Alternatively, negative determinations at block 745 will prompt output to summary XML file at block 755. If available, a comment may be displayed at block 760 to provide notice of a negative determination. Negative determinations at block 755 will prompt determination logging of an unknown command at block 785. Similarly, errors posted at block 770 may be logged at block 780. At block 790, determination may be made as to addressing of each element received at block 705. Process 700 may be terminated at block 795.

4. Supporting New Hardware

In accordance with another aspect of the invention, one embodiment of the framework (e.g., framework 300) may provide support for integration of new hardware (e.g., hardware requisition 306). In one embodiment, the framework may include a procedure for amending or updating the SHIP that may be part of installation process 500. As such, a replaceable parameter may be employed by the framework to allow flexibility of software components provided to a network device including adding new hardware. In one embodiment, a replaceable parameter may be defined within the framework as an XML file associated with driver installation. As such, child elements of a parameter may use a parameter name as the parameter, wherein a value replaces the parameter. In another embodiment, a script file may load elements under the root element to be included as part of the installation. The script file may be an active scripting file provided by an operating system of a network device.

Referring now to FIG. 8, process 800 is shown for adding new hardware into a SHIP (e.g., SHIP 600) according to one or more embodiments of the invention. Process 800 may be initiated to identify a make and model of the new hardware at block 805. Using make and model identification determined at block 805, the new hardware may be categorized as requiring one of a global and local driver installation file at block 810. Local driver installation files allow hardware to be integrated with network devices to operate in particular regions. Alternatively, global driver installation files may provide hardware integration with network devices not specified for a single region. In certain embodiments, global and local driver installation files may be defined by XML driver installation file. In one embodiment, new hardware requiring a local XML driver installation file may initiate a check at block 815 to determine if such a local XML driver installation file exists. In one embodiment, if the check at block 815 indicates that the local XML driver installation file does not exist, such a file may be created at block 820. Local XML driver installation file located at block 815 and/or created at block 825 may be evaluated. Similarly, new hardware requiring a global XML driver installation file as determined at block 810 may be evaluated. In one embodiment, process 800 may include evaluation of a XML driver installation file using one of an advanced XML file editor and any XML text editor in general.

Evaluation of local and/or global XML driver installation files may be initiated at block 830 for determining if the make and model XML is correctly referenced with a XML driver installation file. If the make and model file is not supported by the XML driver installation file, a new make and model file may be created at block 860. If the determination at block 830 indicates that the make and model of a new hardware device is supported by the XML driver installation file, validation of the contents of the XML driver installation file may be performed at block 835. A determination indicating that the driver sets do not match may follow with creation of a new make and model file at block 860. A determination at block 835 of driver sets that match may initiate a family definition check at block 840. In one embodiment, a family definition check at block 840 may evaluate a family definition of a new hardware device and the XML driver installation file. A family definition may be used to support multiple hardware types that may be basically the same and utilize different driver sets as described above in more detail with respect to FIG. 6. If the determination at block 840 indicates that the XML driver installation file does not match a family name of the hardware device, a new family name may be created and applied to the XML driver installation file at block 855. A determination at block 840 of matching information may follow with a determination of make and model information matching with a family name of the hardware device at block 845. As such, if the determination at block 845 indicates that the make and model information does not match a family name of the hardware device a new family name may be created and applied to the XML driver installation file at block 855. Positive indications at block 845 establish the support of a make and model file. Process 800 may be terminated at block 865 following processing at blocks 850, 855 and 860.

5. Management of Network Device Information

Another aspect of the invention may be to provide framework (e.g., framework 300) configured to provide management of a network device. In one embodiment, management (e.g., management functions 310) may include management of network devices (e.g., network devices $418_{1-n}$, $428_{1-n}$ and $438_{1-n}$) and their associated code servers (e.g., code servers $415_{1-n}$, $425_{1-n}$ and $435_{1-n}$), domain controllers, and assigned IP networks. As such, installation of network devices may be executed from the nearest code servers, thereby ensuring the fastest possible installation (e.g., installation 500). According to another embodiment, the framework may include a personalized information management system (PIMS) that allows for the management of group software components associated with a regions configuration. Group software components may provide at least one of: specifying installation servers that are used as repositories for installations, managing site information, IP Network definitions and site assignments, IP fallback definitions and site assignments, client type configurations (e.g., client type 100) and application install configurations and their linkages to client types. According to an additional embodiment, site management may include updating of security files, wherein updating may include connection to code servers during a Group Client installation process and setting of default local administrator's password.

In another embodiment, the framework (e.g., framework 300) may provide rapid installation for network devices. As such, a private information management system (PIMS) (e.g., PIMS Tool 344) may be configured to manage software components of the network (e.g., network 400). The PIMS may provide at least one of specifying code servers storing group client installations, managing site information, IP network definitions and site assignments, IP fallback definitions and site assignments, client type configurations (e.g., client type $200_{1-n}$) and application installation configurations including their connection with client types. PIMS may be provided through an application set which operates on top of the Remedy Action Request system. Access to PIMS may be provided to framework users with Action Request software installed on the computer accessing the solution.

In yet another embodiment, the PIMS may be configured to provide management of a fallback network. As such, a fallback network may be configured to ensure that, no matter where an installation is running from, a code server may be located that is at least relatively close to the location of the network device being installed. The fallback network may be utilized by the installation process (e.g., installation process 500) according to one embodiment of the invention. In one embodiment, if an installation technician is using an out of date boot disk, or the network device corresponds to a new site that has not yet been incorporated into the boot disk, the installation process may be configured to locate a connection to a server and reload the network location. A new file provided by the relocation may include current mappings that contain the new site. Management of the fallback networks may be similar to management of direct IP Network assignments. An additional embodiment may include management of locale information including keyboard and language assignments for terminal devices. PIMS system may be configured to provide default assignment of locales based upon the defined standards offered by an operating system on the terminal devices. Control of languages and keyboards may be supported within the Group Client options. Such information may be saved in a locale XML file and provided as a reference to sites with a specific locale as defined in more detail with respect to FIG. 2.

In yet another embodiment, management of XML file creation may be provided by framework using the PIMS. In one embodiment, a refresh of configuration files used in the Group Client installation process may be provided. The refresh may include a Network Locator XML file, which is located on the operating system boot disk and contains the mapping of IP subnets to sites. The refresh may be applied to a Local Networks XML file, which contains detailed information about each site and domain. Additionally, a refresh may be applied to a Locale XML file, which contains all locale, language, and keyboard information supported in the Group Client. Refreshing these files may result in a complete rebuild, in which if the files exist in the root of a network device memory. As such, files may be opened, cleaned, and repopulated with all data currently managed by the PIMS solution.

6. Graphical User Interface

Figure 9:
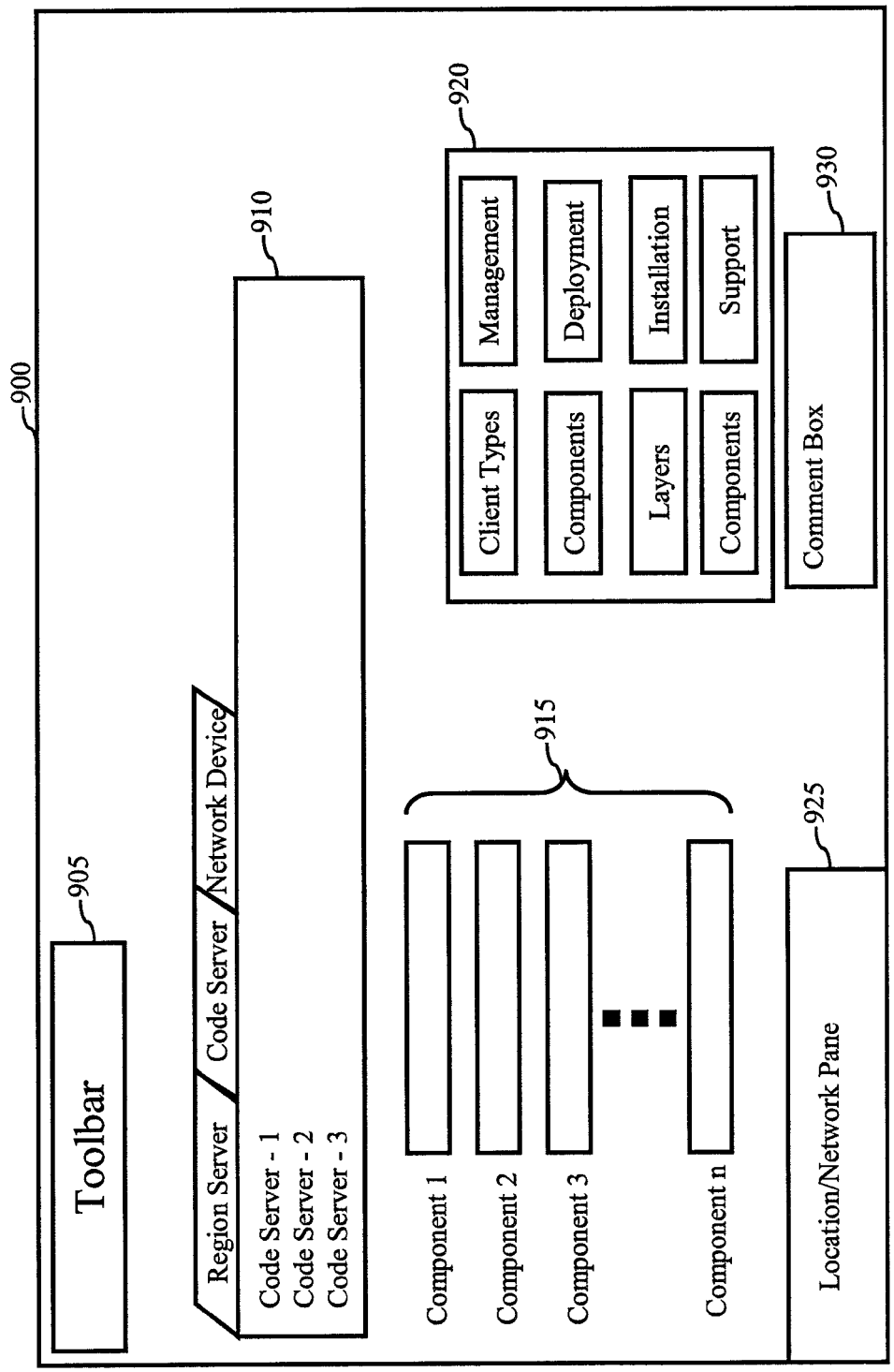
FIG. 9 depicts a simplified representation of a graphical user interface as may be employed by the framework of FIG. 3.

Referring now to FIG. 9, a graphical user interface (GUI) may be employed in the framework 300 of FIG. 3. GUI 900 is one embodiment thereof. According to one embodiment of the invention, GUI 900 may be utilized for deployment of software components to any and all of network devices $418_{1-n}$, $428_{1-n}$ and $438_{1-n}$, code servers $415_{1-n}$, $425_{1-n}$ and $435_{1-n}$ and geographic region servers $410_{1-n}$ of the network 400 of FIG. 4. As such, GUI 900 may be employed for deployment of software components and completer installation of an operating system for the software components of network 400. Similarly, GUI 900 may be employed for management of driver integration, and management of a network region (e.g., regions $405_{1-n}$).

In one embodiment, GUI 900 may be displayed on a network device and/or a display device associated with the network device. GUI 900 is shown including toolbar region 905 which may include functions employed by the framework as described in more detail above with reference to FIG. 3. Toolbar region 905 may include operations associated with an operating system of a network device. According to another embodiment, GUI 900 may include display area 910 which may be used to list network devices such as geographic region servers, code servers and network devices. In one embodiment, display area 910 may be configured for selection of one or more network devices. GUI 900 may be configured to deploy and or manage software components to the selected devices. As such, component fields 915 may be used for entering software components for a selected network device. As may be appreciated, component fields may be fillable by a user, be associated with drop down menus and/or associated with client types (e.g., client type 100). GUI 900 may include location/address pane 925 to provide IP address information and/or physical location for a selected network device. GUI 900 may include display area 920 for access to operations described in more detail with reference to FIG. 3. To that end, display area 920 may interoperate with code servers (e.g., code servers $415_{1-n}$, $425_{1-n}$ or $435_{1-n}$) and/or geographic region servers (e.g., geographic region servers $410_{1-n}$) to present software components associated with client types (e.g., client type 100) and/or client type layers of a selected network device. Alternatively, GUI 900 may be configured to provide client type information associated with a standard deployment client type as described above in more detail with reference to FIG. 1. Additionally, GUI 900 may provide flexibility for defining a completely localized implementation to design specifications of network devices for a specific location (e.g., region $405_{1-n}$). According to another embodiment, GUI 900 may include comment box 930 for entering user information associated with a selected network device.

7. Spoke and Wheel Synchronization

According to another aspect of the invention, framework may be configured to provide directory and file synchronization to servers throughout the network (e.g., network 400). As such, a flexible wide area network link replication scheme is provided by the framework, according to one or more embodiments of the invention. In one embodiment, a central location may be configured to replicate all installation data for code servers (e.g., code servers $410_{1-n}$) in the extended network, wherein the data may be replicated to a single server in each region from the central assigned unit. To that end, each server, in separate regions, may be configured to replicate data received to code servers for that particular region. In one embodiment, a hub may refer to a server providing data. As such, a spoke may be a receiving device, (e.g., code server, network device) configured to receive data from the hub.

Figure 10:
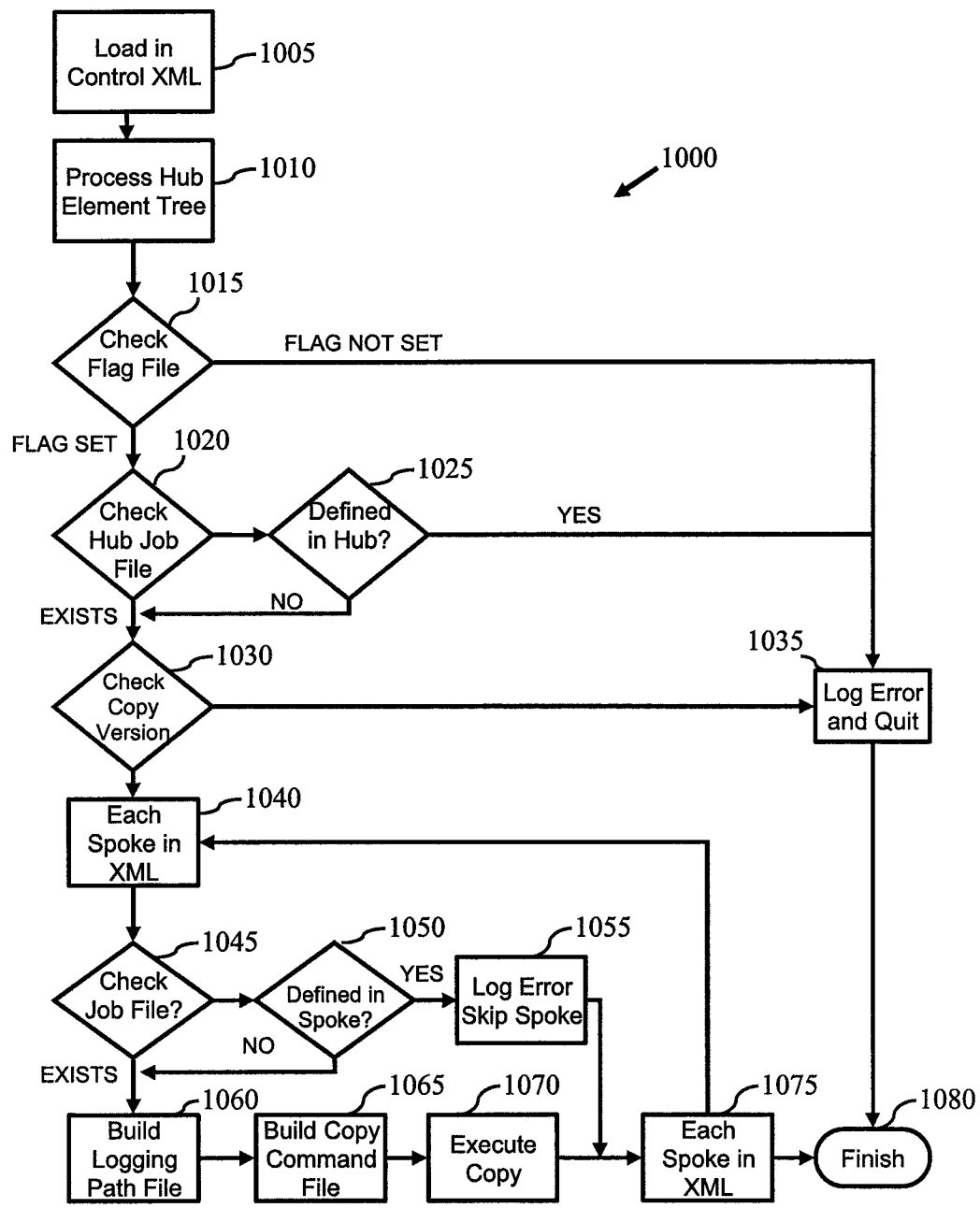
FIG. 10 depicts a flow chart for a hub and spoke replication process as may be employed by the framework of FIG. 3.

Referring now to FIG. 10, process 1000 is provided for replicating data for code servers (e.g., code servers $410_{1-n}$) as may be employed by framework of FIG. 3. Process 1000 may include loading a control XML file at block 1005. The control XML file may be loaded at a command line of the operating system of an assigned server. Process 1000 continues with processing a hub element tree, at block 1010, such that configuration information is determined about the hub and spokes that may be replicated. A replication flag file may be checked at block 1015. If a flag is set, process 1000 may continue with determining hub job file at block 1020. Process 1000 may include checking if a hub job file was defined at block 1025. In one embodiment, a hub job file may contain command line parameters that guide the replication process. The hub file may be configured to include source path information, global file and directory exclusions to spokes, and standard copy application flags. If the hub file is specified and the file does not exist, the process may terminate. However, the contents of the hub file may not be verified. Results at block 1015 and 1025 may initiate logging of an error and quitting at block 1030. Process 1000 may include determining a copy application version at block 1035 if the check at block 1020 exists, or if no hub was defined at block 1025. In one embodiment, the copy application may be a utility configured to provide copying of directories and files, and/or synchronizing files. It may be appreciated that a plurality of utility applications may be used to provide the copying application.

According to another embodiment, process 1000 may include performing a check to determine each spoke available at block 1040. Process 1000 may further include a check for a spoke job file, which may be determined at block 1045. A spoke job file may be a self written script file, by a code server, providing direction for replicating data to a spoke. If a spoke job file exists, a logging file path may be built at block 1060. If the result of spoke job file check at block 1045 determines a job file does not exist, a check for a job filed defined in the spoke may be performed at block 1050. In one embodiment, the spoke job file may be configured as a text file containing command line parameters which may guide the replications process. As such, the spoke file may be assigned to a particular spoke. The spoke job file may include a target path used for replication, local file and directory exclusions from all replications to spokes and spoke specific copy application flags. If the result at block 1050 indicates job file defined in spoke, an error may be logged and the spoke may be skipped at block 1055. Process 1000 may include building a copy application at the command line at block 1065. In one embodiment, a copy application may be configured to transfer data from a hub to the spoke. Data to be transferred may be at least one of user defined and system defined. The copy application may be executed at block 1070. At block 1075, determination of each spoke being addressed may be performed. To that end, process 1000 may be terminated at block 1080.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for deploying and managing software components to a plurality of network devices of an extended data communications network, the method comprising the acts of:
    defining a plurality of client types each of which is associated with particular software components to be installed on the plurality of network devices;
    assigning one of the plurality of client types to all of the plurality of network devices on which the particular software components associated with such client type are to be installed, and without regard to which software components were previously installed in the plurality of network devices;
    receiving a client type of the plurality of client types corresponding to software components to be provided to at least one of the plurality of network devices;
    identifying each of the plurality of network devices that was assigned said client type based on comparing the client type to the plurality of client types assigned to each of the plurality of network devices;
    providing said software components to only said identified plurality of network devices based on said identified at least one network device having been assigned the client type;
    installing said software components on said identified plurality of network devices such that functional capabilities of the software components may be employed by the network device; and
    storing a record of the software components installed on the identified plurality of network devices on a hub server associated with the extended data communications network.

2. The method of claim 1, wherein said client type comprises a plurality of client type layers, wherein each client type layer defines at least one of said software components.

3. The method of claim 2, wherein each software component includes at least one of applications, packages, settings, drivers, scripts and computer data in general.

4. The method of claim 2, wherein said client type is embodied as a client type XML file.

5. The method of claim 1, wherein said stored record details information associated with said software components.

6. The method of claim 1, further comprising managing installation of said software components to said at least one network device, wherein managing includes at least one of updating software components based in part on said stored record and tracking installation of a first component, of the plurality of software components.

7. The method of claim 6, further comprising employing a graphical user interface (GUI) at least one of said installing and said managing.

8. The method of claim 6, wherein installing software components for said at least one network device comprises employing a hub and spoke replication technique.

9. A system for deploying and managing software components to a plurality of network devices of an extended data communications network, the system comprising:
    a plurality of network devices;
    a hub server;
    a memory containing processor-executable instructions for deploying and managing software components to said plurality of network devices; and
    a processor electrically coupled to the memory, the hub server and the plurality of network devices, the processor configured to execute the processor-executable instructions to:
    define a plurality of client types each of which is associated with particular software components to be installed on the plurality of network devices,
    assign one of the plurality of client types to all of the plurality of network devices on which the particular software components associated with such client type are to be installed, and without regard to which software components were previously installed in the plurality of network devices,
    receive a client type of the plurality of client types corresponding to software components to be provided to the at least one of the plurality of network devices,
    identify each of the plurality of network devices that was assigned said client type based on comparing the client type to the plurality of client types assigned to each of the plurality of network device,
    provide said software components to only said identified plurality of network devices based on said identified at least one network device having been assigned the client type,
    install said software components on said identified plurality of network devices such that functional capabilities of the software components may be employed by said at least one network device, and
    store a record of the software components installed on the identified plurality of network devices on the hub server associated with the extended data communications network.

10. The system of claim 9, wherein said client type comprises a plurality of client type layers, wherein each client type layer defines at least one of said software components.

11. The system of claim 10, wherein each software component includes at least one of applications, packages, settings, drivers, scripts and computer data in general.

12. The system of claim 10, wherein said client type is embodied as a client type XML file.

13. The system of claim 9, wherein said stored record details information associated with said software components.

14. The system of claim 9, wherein the processor is further configured to execute the processor-executable instructions to manage installation of said software components to said at least one network device, wherein managing includes at least one of updating software components based in part on said stored record and tracking installation of a first component, of the plurality of software components.

15. The system of claim 14, wherein the processor is further configured to execute the processor-executable instructions to employ a graphical user interface (GUI) for at least one of installing and managing software components.

16. The system of claim 14, wherein installing software components for said at least one network device comprises employing a hub and spoke replication technique.

17. A computer program product, comprising:
a non-transitory processor readable storage medium having processor executable code embodied therein to deploy and manage software components to a plurality of network devices of an extended data communications network, the non-transitory processor readable storage medium having:
processor executable program code to define a plurality of client types each of which is associated with particular software components without regard to which software components were previously installed in the plurality of network devices;
processor executable program code to assign one of the plurality of client types to all of the plurality of network devices on which the particular software components associated with such client type are to be installed;
processor executable program code to receive a client type of the plurality of client types corresponding to software components to be provided to for the at least one of the plurality of network devices;
processor executable program code to identify each of the plurality of network devices that was assigned said client type based on comparing the client type to the plurality of client types assigned to each of the plurality of network device;
processor executable program code to provide said software components to only said identified plurality of network devices based on said identified at least one network device having been assigned the client type;
processor executable program code to install said software components on said identified plurality of network devices such that functional capabilities of the software components may be employed by said at least one network device; and
processor executable program code to store a record of the software components installed on the identified plurality of network devices on the hub server associated with the extended data communications network.

18. The computer program product of claim 17, wherein said client type comprises a plurality of client type layers, wherein each client type layer defines at least one of said software components.

19. The computer program product of claim 18, wherein each software component includes at least one of applications, packages, settings, drivers, scripts and computer data in general.

20. The computer program product of claim 18, wherein said client type is embodied as a client type XML file.

21. The computer program product of claim 17, wherein said stored record details information associated with said software components.

22. The computer program product of claim 17, further comprising processor-executable code to manage installation of said software components to said at least one network device, wherein managing includes at least one of updating software components based in part on said stored record and tracking installation of a first component, of the plurality of software components.

23. The computer program product of claim 22, further comprising processor executable program code to employ a graphical user interface (GUI) for at least one of installing and managing software components.

24. The computer program product of claim 22, wherein installing software components for said at least one network device comprises employing a hub and spoke replication technique.

* * * * *